United States Patent [19]

Sauer et al.

[11] 4,370,887
[45] Feb. 1, 1983

[54] DEVICE FOR MEASURING THE MASS OF A FLOWING MEDIUM

[75] Inventors: Rudolf Sauer, Benningen; Peter Romann, Stuttgart, both of Fed. Rep. of Germany

[73] Assignee: Robert Bosch GmbH, Stuttgart, Fed. Rep. of Germany

[21] Appl. No.: 227,866

[22] Filed: Jan. 23, 1981

[30] Foreign Application Priority Data

Feb. 1, 1980 [DE] Fed. Rep. of Germany ....... 3003671

[51] Int. Cl.³ .............................................. G01F 1/68
[52] U.S. Cl. ......................................... 73/204; 73/116
[58] Field of Search ..................... 73/204, 116, 861.02, 73/346

[56] References Cited

U.S. PATENT DOCUMENTS

| 2,849,880 | 9/1958 | Obermaier | 73/204 |
| 3,971,247 | 7/1976 | Rodder | 73/204 |
| 4,196,622 | 4/1980 | Cornelius | 73/204 |
| 4,252,016 | 2/1981 | Sauer et al. | 73/204 |
| 4,299,124 | 11/1981 | Knapp | 73/204 |
| 4,299,125 | 11/1981 | Romann et al. | 73/204 |
| 4,326,412 | 4/1982 | Kobayashi et al. | 73/204 |

Primary Examiner—Howard A. Birmiel
Attorney, Agent, or Firm—Edwin E. Greigg

[57] ABSTRACT

A device is proposed for measuring the mass of a flowing medium, in particular for measuring the aspirated air mass in internal combustion engines, which has a temperature-dependent resistor disposed in the flow of the medium, the temperature and/or resistance of which is controlled in accordance with the mass of the medium, the control variable serving as a standard for the mass of the medium. The temperature-dependent resistor is embodied as a hot strip or hot wire guided over at least three support points. In order to improve the measurement precision of the hot strip or hot wire and reduce the deposition of dust thereon, the hot element is provided at an inclination relative to the flow direction of the medium.

6 Claims, 6 Drawing Figures

DEVICE FOR MEASURING THE MASS OF A FLOWING MEDIUM

CROSS REFERENCE TO RELATED APPLICATIONS

This application is an improvement upon and a departure from the invention found disclosed and claimed in the following U.S. patent applications and patents:

| Applicant(s) | Application Serial No. | Filed | U.S. Pat. No. |
|---|---|---|---|
| Hafner & Romann | 136,659 | Apr. 2, 1980 | 4,325,253 |
| Hafner & Romann | 15,994 | Feb. 28, 1980 | — |
| Hafner & Romann | 83,696 | Oct. 11, 1979 | 4,304,128 |
| Knapp | 64,265 | Aug. 6, 1979 | 4,299,124 |
| Peter | 944,587 | Sept. 21, 1978 | 4,196,622 |
| Sauer et al | 42,258 | May 24, 1979 | 4,252,016 |
| Romann | 200,722 | Oct. 27, 1980 | 4,338,814 |

BACKGROUND OF THE INVENTION

The invention is based on a device for measuring the mass of a flowing medium as described by the preamble to the main claim. A device for measuring the mass of a flowing medium is already known in which a hot wire is used as a temperature-dependent resistor, which wire is tautly fastened at a plurality of fastening points in a sensor ring and extends perpendicularly to the flow direction of the medium. It has been demonstrated that finely-grained, dry silicate dust, to which the sensor may be exposed during trips in dusty regions, can form an undesirable coating on the hot wire, restricting the measurement precision of the wire and perhaps even causing the destruction of the wire. The prior art has attempted to cope with this phenomena, but even the known process of burning off deposits by heating the wire to red-hot temperatures does not bring about a satisfactory restoration of the wire's measurement precision; in fact, it may worsen the situation, because the dust particles can become firmly sintered to the wire.

OBJECT AND SUMMARY OF THE INVENTION

It is a principal object of the invention having the characteristics of the main claim to permit as little undesired coating of the hot strip by dry dust as possible, while providing simultaneously that the advantages of the red-hot burn-off procedure, which are so effective for organic deposits, are retained in full.

Further advantageous objects of the invention are provided by the modifications of and improvements to the device disclosed in the dependent claims.

The invention will be better understood and further objects and advantages thereof will become more apparent from the ensuing detailed description of the preferred embodiments taken in conjunction with the drawings.

DESCRIPTION OF THE PREFERRED EMBODIMENTS

Figure 1:
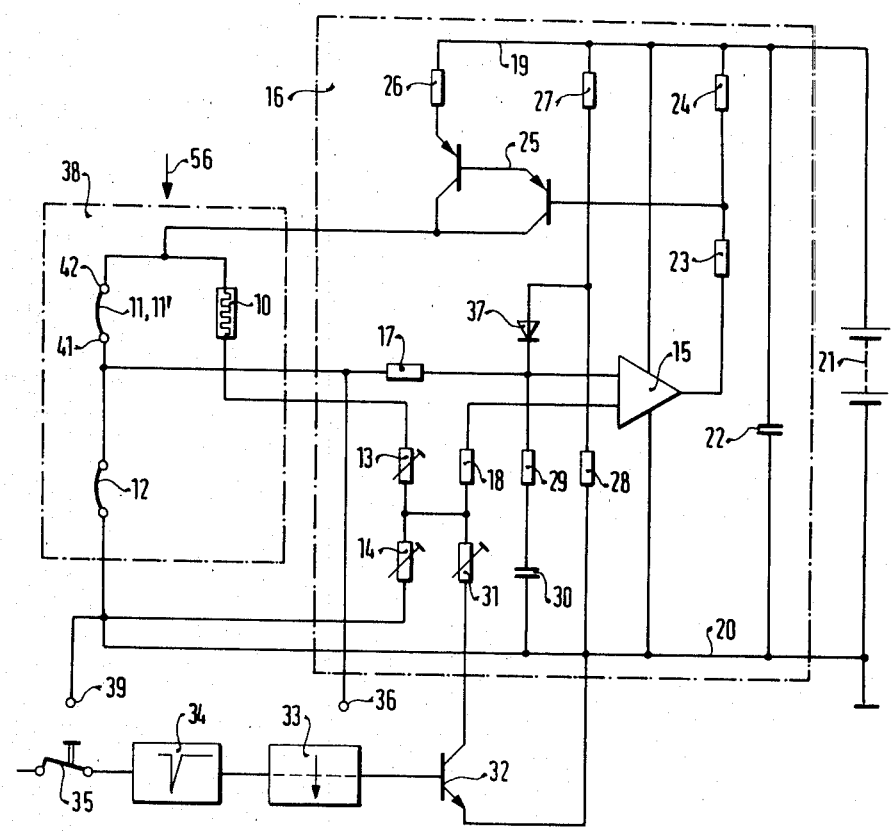
FIG. 1 is a schematic circuit diagram of a device for measuring the mass of a flowing medium, in particular for measuring the intake air mass in internal combustion engines.

Referring to the drawings, FIG. 1 shows a device for measuring the mass of a flowing medium, which is intended particularly for measuring the aspirated air in internal combustion engines. A bridge circuit is provided comprising a temperature-dependent resistor 10, a temperature-dependent resistor 11 or 11', a resistor 12 and resistors 13 and 14. A control amplifier 15 of a closed-loop control device 16 is connected to the diagonal of the bridge. The inverting input of the control amplifier 15 is connected via an input resistor 17 with the junction of the resistors 11, 11' and 12, while the noninverting input of the control amplifier 15 is connected via an input resistor 18 to the junction point of the resistors 13 and 14. The control amplifier 15 is connected via two supply lines 19 and 20 to a source of direct-current voltage 21. This direct-current voltage source 21 is switched in parallel to a smoothing capacitor 22. The output of the control amplifier 15 is connected with the series circuit comprising two resistors 23 and 24, with the resistor 24 being connected to the common supply line 19. These two resistors 23 and 24 represent a voltage divider for a Darlington circuit 25, which together with a resistor 26 form a voltage-controlled current source for supplying the bridge circuit made up of resistors 10, 11, 11', 12, 13 and 14 with electric current. A voltage divider comprising the resistors 27 and 28 is switched between the common supply lines 19 and 20. The anode of a diode 37 is connected to the junction of the resistors 27 and 28, and the cathode of this diode 37 is connected with the inverting input of the control amplifier 15. The series circuit comprising a resistor 29 and a capacitor 30 is switched between the inverting input of the control amplifier 15 and the common supply line 20; this resistor-capacitor combination serves the purpose of tuning the frequency of the closed-loop control circuit to the time-dependent behaviour of the temperature-dependent resistors.

A resistor 31 is connected to the junction of the resistors 13 and 14 and can be connected, via the switching path of a switching transistor 32 with the common supply line 20. The base of the switching transistor 32 is connected with the output of a monostable multivibrator 33, which is triggerable via a differentiation element 34, either by an ignition switch indicated at 35, for the ignition system of the engine or by a pulse furnished by some other means.

The mode of operation of the device described is as follows:

A predetermined electric current flows over the temperature-dependent resistor 11, 11' of the bridge circuit and heats this resistor 11, 11' up to its normal operating temperature. In another branch of the bridge circuit, the the temperature-dependent resistor 10 assumes a resistance value which characterizes the temperature of the flowing medium, for instance the aspirated air of the engine. What is attained as a result is that it is the temperature of the aspirated air of an engine which is always used as a reference signal for the closed-loop control of the heating current of the device for air flow measurement. Depending on the mass of the aspirated air flowing past the resistor, the temperature-dependent resistor 11, 11' is cooled to a greater or lesser extent. This cooling phenomena causes an imbalance in the bridge circuit. This imbalance in the bridge circuit is then regulated so that the control amplifier 15 furnishes a higher supply current to the bridge circuit via the voltage-controlled current source 23, 24, 25 and 26; thus the temperature of the temperature-dependent resistor 11, 11', and accordingly its resistance value, can be held to a level which is at least approximately constant. The current flowing through the bridge circuit sets a standard for the air mass flowing past the temperature-dependent resistor 11, 11' in the direction of the arrow 56 (see FIG. 2). A corresponding electrical signal may be picked up between a terminal 36 and a terminal 39.

In order to make it simpler to start up the closed-loop control apparatus, the voltage divider 27, 28 is provided with the diode 37. When the closed-loop control apparatus is switched on, a voltage of approximately 0.5 volts is brought about at the inverting input of the control amplifier 15; this voltage permits reliable starting up of the control apparatus. During normal operation, however, the voltage at the inverting input of the control amplifier 15 will be substantially higher than this initial voltage, so that the diode 37 is blocked and thus the voltage divider 27, 28 can have no influence upon the closed-loop control procedures.

In order from time to time to remove deposits from the surface of the hot strip 11 or hot wire 11', as the temperature-dependent resistor will be described hereinafter, an increased electric current is intended to flow over this temperature-dependent resistor 11, 11' after a predetermined measurement cycle. A particular duration of engine operation, for instance, may be selected as the predetermined measurement cycle. Alternatively, burn-off procedure may be triggered each time the ignition system of the engine is shut off. This occurs when the ignition switch 35 is switched off. The corresponding signal is differentiated and directs the monostable multivibrator 33 to assume its unstable switching state. During this unstable switching state of the monostable multivibrator 33, the switching transistor 32 becomes conductive and switches the resistor 31 parallel to the resistor 14 of the bridge circuit. As a result, the bridge circuit comprising the resistors 10, 11, 11', 12, 13 and 14 becomes severely imbalanced, so that the control amplifier 15 furnishes an increased electric current to the bridge circuit in order to compensate for this imbalance. This increased current heats the temperature-dependent resistor 11, 11', for the duration of the unstable switching state of the monostable multivibrator 33, to a temperature which is above the normal operating temperature, so that deposits on the surface of the temperature-dependent resistor burn off.

It has proved to be particularly advantageous for the temperature-dependent resistor 11, 11' to be made from a strip of wire of structurally stabilized platinum, because this material is particularly well suited to being heated to high temperatures. This is particularly important for the burn-off procedure.

It is also advantageous for the reference resistor 12 to be housed in the flow cross section indicated by a broken line 38, such as the intake manifold of the engine, because then the lost heat of the reference resistor 12 can be carried away by the air flowing in the direction of the arrow 56. The resistors 13 and 14 are desirably embodied as adjustable resistors, so that the temperature behavior of the closed-loop control circuit can be adjusted.

Figure 2:
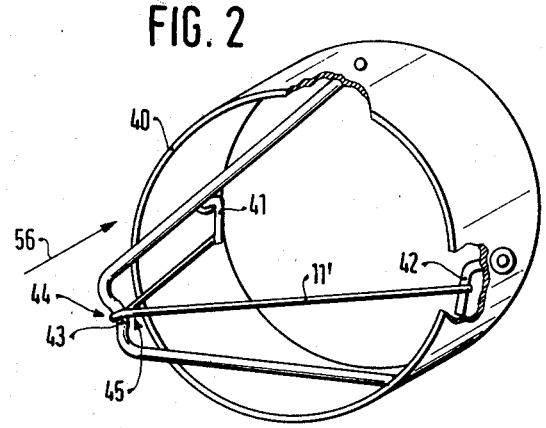
FIG. 2 is a perspective view of a hot strip embodied in the form of a V and affixed at three support points.

In FIG. 2, a sensor 40 is shown schematically as a ring; naturally, the sensor may also be provided in some other useful shape. The sensor has at least three support points 41, 42 and 43 extending substantially parallel to one another. With the aid of the support points 41, 42 and 43, the temperature-dependent resistor 11', embodied here as a so-called hot wire 11', is disposed in the form of a V. The hot wire 11' is secured with its ends to the two terminal support points 41 and 42 only, as by soldering or welding, for instance, and then guided only loosely over the support point 43. Alternatively, a hot strip 11 could be secured to the sensor 40 in the manner described, in place of the hot wire 11'. The hot strip 11 is preferably secured to the terminal support points 41, 42 so as to be linearly parallel to the support points, so that the hot strip 11 cannot become twisted, which would cause a change in the transfer of heat and thus in the characteristic curve of the sensor.

The sensor 40 is provided with heat-expansion coefficients adapted to the heat-expansion coefficients of the hot strip 11, so that changes in length on the part of the hot element 11 or 11', or the sensor ring 40, caused by heat expansion will result in virtually no tensile or compressive stresses in the hot element 11, 11'; instead, such stresses are substantially compensated for by alterations in spacing between the support points 41, 42, 43.

The suspension of the hot element 11, 11' in such a manner that it is free of tensile and compressive stresses is extremely important if the hot wire is intended to be used, for instance, as an air flow rate meter in the intake manifold of an internal combustion engine. The range of temperatures which such hot element must accommodate is generally between −30° C. and +120° C. In addition, a further temperature change, dictated by the mode of operation of the hot wire 11' or hot strip 11, must also be taken into consideration. Indeed, as already noted, the hot wire or hot strip must also be heated up to a high temperature in order to burn off deposits adhering to its surface. Even this brief increase in temperature causes changes in length on the part of the wire or strip, which, if the hot element were held rigidly in place, could cause tensile and compressive stresses. Suspending the hot wire 11' or hot strip 11 in the form of a V and rendering compatible the heat-expansion coefficients of the sensor ring 40 and of the hot wire 11' or hot strip 11 to one another substantially prevent the application of tensile or compressive stresses to the hot wire 11' or hot strip 11. In the case where hot wire 11' or hot strip 11 is made of platinum the sensor ring 40 is manufactured preferably of a nickel-iron alloy, because the heat-expansion coefficients of these materials are approximately equal. It is also possible to manufacture the sensor ring of glass, especially so-called platinumglass. The heat-expansion coefficient of such glass is approximately equal to that of the platinum, so that tensile or compressive stresses can substantially be prevented from affecting the hot wire 11' or hot strip 11.

As shown in FIG. 2, the support points 41, 42, 43 extending parallel to one another may be bent in hooklike fashion. At least the terminal support points, which serve to carry electric current, are secured in the sensor ring 40 in such a manner that they are electrically insulated from the sensor ring 40. The middle portion of the hot wire 11' or hot strip 11, which is guided about the support point 43, forms a loop 44, while the portions of the hot wire 11' or hot strip 11 which extend to either side of this support point 43 are connected with one another in an electrically conductive manner in contact region 45; this connection may be made by soldering or welding, for example. As a result, the loop 44 is not subject to electric current and thus is not heated up by such a current. The difficulties which normally arise with an indefinite convection of heat away from the hot wire 11' or hot strip 11 about the support point 43, where there have been changes in length or displacements of the hot wire 11' or hot strip 11 on the support point 43, no longer occur. Because of the specialized suspension provided to the hot element on the support point 43, it is no longer significant if the hot wire 11' or hot strip 11 should lift slightly off the support point 43 as a result of heat expansion or if the hot element should twist or change position.

Figure 3:
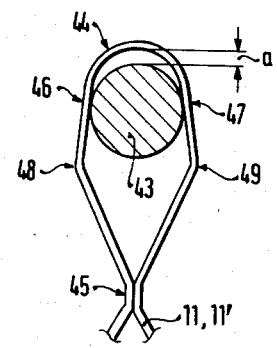
FIG. 3 shows in a cross-sectional view a loop-like embodiment of a hot strip in the vicinity of a central support point.

It is particularly desirable to embody the loop 44, provided for supporting the hot wire 11' or hot strip 11, in the shape illustrated in FIG. 3. As best shown in FIG. 3, the wrap angle of the loop 44 is smaller than 180°. Furthermore, the shape of the loop 44 is selected to provide a sufficient distance between two contact points 46 and 47, where the loop 44 rests on the support point 43, and two points 48 and 49, from which points 48 and 49 the leg portions of the loop 44 converge into an area of contact 45; in this way, it is possible to assure that, in the event the loop 44 or the hot element 11, 11' expands, no mechanical stresses will be applied to the hot element 11 or 11'. Thus, free mobility of the loop 44 on the support point 43 is assured; the provision of this distance is shown in FIG. 3 as "a".

Figure 4:
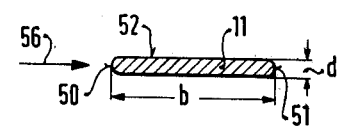
FIG. 4 is a cross section of a hot strip.

In order to fully understand this phenomena, its occurence shall be described. During vehicle operation, particles floating in the air become deposited on the leading edge of the sensor to form deposits, and, after a short interval of operation, these deposits change the characteristic curve of the sensor, causing incorrect measurements of the air flow or even in extreme cases the destruction of the temperature-dependent resistor. As shown in FIG. 4, the temperature-dependent resistor 11 alternatively may be embodied in the form of a band, having an oblong cross section, whose short sides or edges 50, 51 are embodied in a semi-circular shape. The edges 50, 51 may equally well be embodied as conical. The thickness of the band is shown as "d" so that the edges 50, 51 are narrow in comparison with the width "b" of the sides 52 of the hot strip 11. In a special case, the ratio of d:b is 1:10, with the actual dimensions being 0.02 mm: 0.2 mm. In order to minimize the vulnerability of the hot strip to soiling deposit formation, the hot element is guided over the support points 41, 42, 43 in the sensor ring 40 in such a manner that one of the edges 50, 51—specifically, as shown in FIG. 4, the edge 50—is oriented to be the exposed edge, facing counter to the direction of the air flow 56, while the sides 52 substantially extend in the flow direction. As a result, the possibility of the sensor as a whole becoming soiled is so greatly reduced that the measurement signal provided by the sensor over long-term use is assured relatively constant. An additional benefit is provided because the destruction of the hot strip can be prevented.

Figure 5:
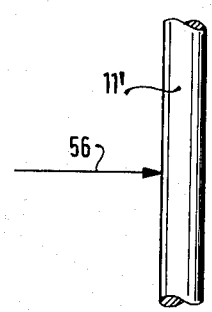
FIG. 5 is a partial, cross-sectional view, known from the prior art, of a hot wire at right angles to the flow direction of the medium.
Figure 6:
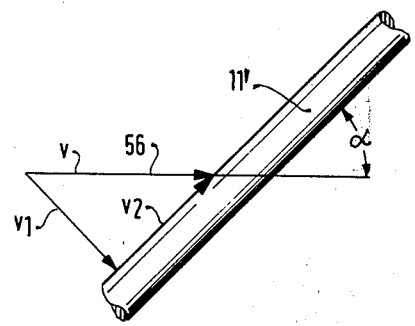
FIG. 6 is a partial, cross-sectional view in accordance with the invention of a hot strip inclined toward the direction of flow of the medium.

The preferred embodiment for preventing the formation of a coating on the hot wire 11' or hot strip 11 due to dust in the air is provided by tilting the hot wire 11' or the hot strip 11 relative to the air flow 56. The disposition of a hot strip 11 in this manner is shown in FIG. 6. In FIG. 5, a hot wire 11' of well known embodiment is shown, disposed in a known manner in the flow of the medium such that the flow of the medium 56 extends perpendicular to the axis of the hot wire 11'.

In FIG. 6, a hot wire 11' in accordance with another embodiment of the invention is shown extending tilted at an angle α toward the flow direction 56. This angle of tilt is preferably between approximately 45° and less than 90° with respect to vertical. As a result of this inclination of the hot wire 11' or hot strip 11, the dust particles, moving at a velocity v in the flow direction 56, move toward the hot wire 11' or hot strip 11 only at a lesser velocity component $v_1$, which is directed perpendicular to the axis of the hot strip 11 or hot wire 11', while the velocity component $v_2$ extending axially of the hot element tends to loosen any of the dust particles deposited on the surface of the hot wire 11' or hot strip 11, so as to remove them.

The inclination of the hot strip 11 or hot wire 11' relative to the direction of the air flow further diminishes the impact energy of the dust particles, thus reducing the number of dust particles which can become firmly attached to the surface of the hot strip 11 or hot wire 11'.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An apparatus for measuring the mass of a flowing medium, in particular for measuring the mass of air aspirated by an internal combustion engine, including at least one temperature-dependent resistor disposed in the flow of said medium, a characteristic of which resistor is controlled in accordance with the flowing mass as a control variable, said control variable forming a standard for measuring the mass of the flowing medium, characterized in that said temperature-dependent resistor is embodied as a hot element provided with three support points disposed in a sensor means, two of said support points disposed in a plane normal to the direction of flow so that said hot element is inclined relative to the flow of the medium at an angle to the vertical which is at least 45° but less than 90°.

2. An apparatus as defined by claim 1, further characterized in that said third support point comprises a substantially central support between said two support points, said hot element having leg portions which form a loop about said central support, and said leg portions converging near said central support to an electrically conductive contact area.

3. An apparatus as defined by claim 2, further characterized in that said hot element is provided with edges and sides, one of said edges being exposed to the direction of the flow of said medium, said sides extending substantially planar to said direction of flow.

4. An apparatus as defined by claim 3, further characterized in that said electrically conductive contact area of said leg portions is effected by welding.

5. An apparatus as defined by claim 3, further characterized in that said electrically conductive contact area of said leg portions is effected by soldering.

6. An apparatus as defined by claim 4, further characterized in that said leg portions forming said loop are rebent about said central support at an angle less than 180°, said loop having an apex at a distance from said central support, said distance permitting a stress-free expansion in length of the leg portions of said element.

* * * * *